United States Patent Office 3,350,425
Patented Oct. 31, 1967

3,350,425
1-ALKYLSULFONAMIDO-4-ANILINO-
ANTHRAQUINONES
Guido R. Genta, Lock Haven, Pa., assignor to American
Aniline Products, Inc., a corporation of Delaware
No Drawing. Filed June 18, 1965, Ser. No. 465,141
6 Claims. (Cl. 260—374)

This invention relates to anthraquinone dyestuffs. In one specific aspect, it relates to new anthraquinone dyestuffs having a remarkable affinity for polyester fibers and which produce thereon blue-to-violet shades. In another aspect, it relates to the dyeing of aromatic polyester fibers, e.g., polyethylene terephthalate or "Dacron," with anthraquinone compounds to produce dyeings having outstanding substantivity, light fastness, and resistance to sublimation.

In recent years there has been a considerable effort expended in the dyestuff industry to find suitable materials for coloring the aromatic polyester fibers. These fibers, which have outstanding utility as textile materials, are made, for example, by heating a glycol of the formula:

$$HO(CH_2)_nOH$$

wherein $n$ is an integer greater than one, but not exceeding 10, with isophthalic or terephthalic acid or with an ester-forming derivative thereof, for example, an aliphatic or aryl ester or half ester, an acid halide or an amine salt, under conditions at which polycondensation is effected. Of these polyesters, polyethylene terephthalate or "Dacron" has made a remarkable impact on the textile industry.

Generally speaking, the aromatic polyester fibers have a poor affinity for dyestuffs and they do not readily absorb colorants from aqueous dispersions. As a result, considerable difficulty has been encountered in finding dyestuffs for, e.g., polyethylene terephthalate, which are acceptable in all of the important physical properties of substantivity, light fastness, and resistance to sublimation. In recent years a number of red anthraquinone dyes have been discovered which have good affinity for polyester fibers and which color these materials bluish-red to pink shades having acceptable fastness to light and sublimation. The search has continued for a blue-to-violet dye which is substantive to polyester fibers and which has good light fastness and resistance to sublimation.

I have discovered a new class of blue-to-violet anthraquinone dyes which gives outstanding overall performance when dyed on aromatic polyester fibers, particularly on polyethylene terephthalate. The affinity for the fibers, light fastness, and resistance to sublimation of my new compounds is quite remarkable when considered in the light of the performance of known anthraquinone dyestuffs which color in blue-to-violet shades.

My new dyes are characterized by an alkylsulfonyl-amino group in the 1-position of the anthraquinone nucleus. The presence of sulfone groups in anthraquinone dyes is not entirely new. Straley et al., in U.S. Patent 3,087,773, disclose a number of 1-amino-2-bromo- (or 2-alkoxy-) 4-arylsulfonaminoanthraquinones which are fast to light, washing, and sublimation when dyed on polyester fibers. These dyes, which are structurally quite different from my compounds, produce on polyethylene terephthalate red shades having a bluish cast and thus are not useful if a blue-to-violet shade is required.

It is, therefore, an object of the invention to provide a new class of anthraquinone colors for dyeing polyester fibers in blue-to-violet shades which are fast to light, washing, and sublimation.

In accordance with the invention, I have discovered a new class of anthraquinone dyes having the formula:

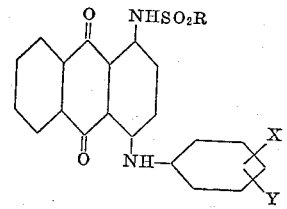

In the above formula R is an alkyl radical having from 1–4 carbon atoms and X and Y can be hydrogen, halo, lower alkyl, lower alkoxy, cyano, or hydroxylower alkyl.

The dyes are made by reacting a 1-amino-4-bromoanthraquinone with an arylamine to provide a 1-amino-4-arylaminoanthraquinone intermediate. The intermediate is then reacted with an alkanesulfonyl chloride to provide the dyestuffs of the invention.

Arylamines useful in preparing the dyes of the invention include aniline, p-chloroaniline, 2,4-dichloroaniline, p-toluidine, o-toluidine, o-anisidine, p-anisidine, p-phenetidine, p-hydroxyethylaniline, and p-aminobenzonitrile. Useful alkanesulfonyl chlorides include methanesulfonyl chloride, ethanesulfonyl chloride, propanesulfonyl chloride, and butanesulfonyl chloride.

Conveniently, the preparation of the 1-amino-4-arylaminoanthraquinone is effected in the presence of a substantial excess of the arylamine. The reaction is accomplished by heating the reactants in the presence of an acid-acceptor or acid-binding agent, such as an alkali metal carbonate, bicarbonate, or acetate. The efficiency of the reaction is improved by the presence of a copper catalyst, such as copper sulfate or copper acetate. The mixture of 1-amino-4-bromoanthraquinone and arylamine is heated to an elevated temperature of at least 160° C., preferably 180–190° C., and held at that temperature until the reaction is complete, which generally requires 12–20 hours.

After the reaction is complete, the intermediate is conveniently recovered by cooling to room temperature and drowning in ice water containing 20° Bé. hydrochloric acid. The product is filtered off and the filter cake is washed acid-free with hot water and dried.

The above procedure can be modified by running the reaction in a high boiling inert solvent, rather than an excess of arylamine. In this case at least one mole of arylamine should be used, based on the weight of the 1-amino-4-bromoanthraquinone. Suitable solvents include the higher boiling aromatics, such as o-dichlorobenzene, trichlorobenzene, and the like.

The reaction of the 1-amino-4-arylaminoanthraquinone intermediate with the alkanesulfonyl chloride is best accomplished in the presence of a tertiary base, preferably pyridine. Other useful tertiary bases include alpha-picoline, quinoline, dimethylaniline, diethylaniline, triethylamine, dimethylformamide, and dimethylacetamide. It is convenient to use a large excess of tertiary base to serve as a solvent for the reaction. The reaction mixture is heated to an elevated temperature of 70–90° C. for two to five hours. After cooling to room temperature, the product is recovered by filtration and the filter cake is washed with cold water.

An alternative procedure for making the dyes of the invention involves bromaminic acid (1-amino-4-bromoanthraquinone-2-sulfonic acid) as the starting material. Using this method, bromaminic acid is first reacted with the arylamine and the resulting intermediate is then reduced to remove the sulfonic acid group. The 1-amino-4-arylamino intermediate thus obtained is then reacted with the alkanesulfonyl chloride as described hereabove to produce the dyes of the invention.

The novel dyestuffs obtained as described hereabove are applied to aromatic polyester fibers in the form of a dispersed color powder or paste which is obtained by wet milling, in a conventional apparatus, such as a ball mill or Werner-Pfleiderer mill, the dye obtained as described hereabove with a dispersant, such as sodium lignin sulfonate, and a wetting agent. The dispersed paste or cake thus obtained can also be dried at 70–80° C., and is thereafter micro-pulverized. Sufficient dispersant is added to give a dispersed powder containing generally between about 15–75 percent by weight active dyestuff base.

The dispersed powder, when added to water with or without auxiliary agents, forms a near colloidal aqueous dispersion from which the aromatic polyester fiber or goods is dyed in the conventional manner to give a colored fiber containing about 0.01–2 percent by weight dyestuff.

In order to evaluate the effectiveness of a particular dyestuff for a given type of fiber, the dyed fiber is examined for substantivity of the color, light fastness of the color, and resistance of the color to sublimation.

Substantivity is a measure of affinity of the dyestuff for a particular fiber. In the trade, substantivity is evaluated in terms of "pile on"; in other words, the degree to which the depth of the dyeing is proportional to the amount of dye applied.

The light fastness of a dyed fiber is conveniently measured by accelerated laboratory testing methods involving exposure of the colored fabric to an artificial source of sunlight. The "Atlas Carbon Arc Fade-O-Meter Type FDAR," a commercially available apparatus for this purpose, is quite suitable for obtaining such measurements. The recommended testing procedure is Standard Test Method 16A–1957, which is described on page 107 of the Technical Manual of the American Association of Textile Chemists and Colorists, 35 (1959). For colored aromatic polyester fibers, such as polyethylene terephthalate, an exposure time of from 20–40 hours in the "Fade-O-Meter" with little or no change in the color of the sample being tested shows that the light fastness of the sample is good for most purposes. Certain dyestuffs which are sold commercially for coloring polyethylene terephthalate show, when applied thereto, a break in color after only ten hours exposure. One of the astonishing features of the dyestuffs of the invention is their stability to light even at exposure times of 80 hours and higher. Sublimation characteristics are determined generally according to the so-called dry-sublimation technique, which involves placing the dyed fabric between two undyed swatches and applying heat thereto (up to 400° F.) for one minute. Little or no transference of color to the undyed swatches indicates excellent resistance to sublimation. As I have noted, resistance to sublimation is one of the outstanding properties possessed by the dyestuffs of the invention when they are applied to an aromatic polyester fiber.

My invention is further illustrated by the following examples:

*Example I*

To a 500 ml. three-necked flask equipped with a heater, stirrer, thermometer, and reflux condenser there were charged 150 g. aniline, 35 g. 1-amino-4-bromoanthraquinone, 35 g. anhydrous sodium acetate, and 2 g. of copper acetate. The mixture was heated to 180–185° C. for 16 hours. After cooling to room temperature, the reaction mass was poured into 900 ml. ice water containing 180 g. 20° Bé. hydrochloric acid and stirred for one hour. The reaction product was separated by filtration, washed acid-free with hot water, and dried to give 37 g. (100 percent of theory) 1-amino-4-anilinoanthraquinone.

To a 500 ml. flask equipped with a stirrer, thermometer, heater, and reflux condenser there were charged 100 g. technical grade pyridine, 37 g. 1-amino-4-anilinoanthraquinone, and 15 g. methanesulfonyl chloride. The mixture was heated at 75–80° C. for four hours. After cooling to room temperature, the reaction mass was filtered to separate the product, which was then washed with cold water. There was thus obtained 23 g. of pure 1-methylsulfonylamino-4-anilinoanthraquinone as a wet cake. The 23 g. of pure dye obtained as described hereabove was ball milled for 24 hours with 6 g. of sodium lignin sulfonate, available commercially as "Marasperse N," 6 g. wetting agent, and 57 cc. of water. There was thus obtained 92 g. of a 25 percent bluish-violet paste.

*Example II*

The dyestuff of Example I was evaluated as a color for polyethylene terephthalate as follows:

A colloidal solution of the disperse color of Example I was made by dissolving one gram of standardized disperse color in a medium containing 25 ml. of 10 percent "Igepon T" (described by its manufacturer as

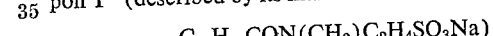

and 475 ml. water at 90–95° C.

The dye bath was prepared as follows: To a stainless steel vessel was charged 190 ml. of 70° C. water. There was then added 5 ml. of one percent "Igepon T" solution and 5 ml. of 10 percent strength modified self-emulsifiable solvent carrier. To the bath there was slowly added with stirring 50 ml. of the previously prepared colloidal solution of dispersed color. Several 5 gram skeins of polyethylene terephthalate were added to the bath and the fibers were turned in the dye bath. The temperature of each bath was raised to 95° C. over a period of 15 minutes and held thereat for one hour. The skeins of the polyethylene terephthalate were then removed and scoured in one liter of 95° C. water containing soap and detergent. After ten minutes of scouring, the skeins were removed and washed with hot water. They were then oven dried at 80–90° C.

The samples of polyethylene terephthalate were visually evaluated for color value and tested for light fastness and sublimation according to the standard AATCC tests referred to hereabove. Light fastness was measured using an "Atlas Carbon Arc Fade-O-Meter Type FDAR" according to standard Test Method 16A–1957. Observations were made at 20 hour intervals for a break caused by the fading of the color. One "Fade-O-Meter" hour represents approximately five days of exposure to sunlight. A definite break in the color before 20 hours exposure time is considered poor. A slight break at 20 hours is rated as fair, and a break between 20 and 60 hours shows that the light fastness is good for most purposes. If the sample withstands more than 60 hours exposure without a break in the color, the light fastness is considered to be excellent. The product of Example I was characterized by excellent light fastness, since the test sample appeared very good after 80 hours exposure. The product also showed very good resistance to sublimation when subjected to temperatures of 365–400° F. using the dry-sublimation technique.

Examples III–VII

Blue to bluish-violet dyestuffs having excellent substantivity and fastness to light and sublimation are obtained according to the procedure of Example I by substituting the following arylamines for the aniline used in Example I.

TABLE I

| Example No. | Arylamine | Color of Product |
|---|---|---|
| III | p-Chloroaniline | Blue-Violet. |
| IV | p-Toluidine | Do. |
| V | o-Anisidine | Do. |
| VI | p-Aminobenzonitrile | Violet-Blue. |
| VII | p-Hydroxymethylaniline | Blue. Do. |

Excellent dyestuffs are also obtained by using ethanesulfonyl chloride or butanesulfonyl chloride for the methanesulfonyl chloride used in Example I.

I claim:

1. A compound of the formula:

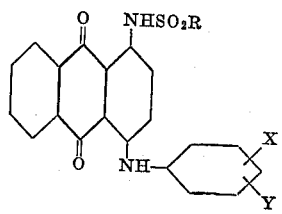

wherein R is an alkyl radical having from 1–4 carbon atoms and X and Y are members selected from the group consisting of hydrogen, halo, lower alkyl, lower alkoxy, cyano, and hydroxy lower alkyl.

2.

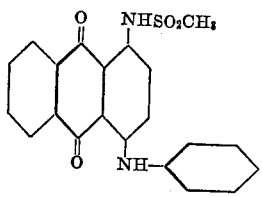

3.

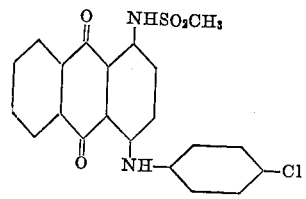

4.

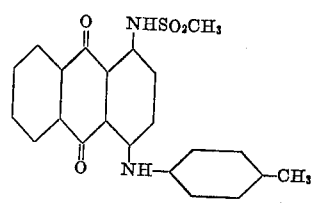

5.

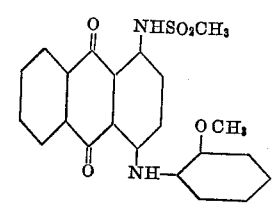

6.

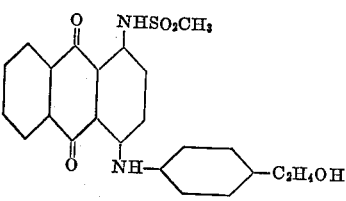

References Cited

UNITED STATES PATENTS 687,658  11/1901  Schmidt et al. _____ 260—374
2,640,059  5/1953  Salvin et al. _____ 260—374 X

FOREIGN PATENTS 1,004,749  3/1957  Germany.
215,943  11/1941  Switzerland.

LORRAINE A. WEINBERGER, *Primary Examiner.*

H. C. WEGNER, *Assistant Examiner.*